United States Patent [19]

Burtelson

[11] 4,414,426
[45] Nov. 8, 1983

[54] AERIAL CABLE TERMINAL

[75] Inventor: Frederick W. Burtelson, Harvard, Ill.

[73] Assignee: Northern Telecom Inc., Nashville, Tenn.

[21] Appl. No.: 310,398

[22] Filed: Oct. 9, 1981

[51] Int. Cl.³ .......................... H01R 9/00; H02G 15/10
[52] U.S. Cl. ......................................... 174/59; 174/41; 339/198 G
[58] Field of Search ............................ 174/41, 59, 60; 339/198 R, 198 G, 198 GA

[56] References Cited

U.S. PATENT DOCUMENTS 2,683,304  7/1954  Channell ............................ 174/41 X
3,836,696  9/1974  Gressitt et al. ....................... 174/41
3,937,550  2/1976  Gillemot ............................ 174/41 X Primary Examiner—A. T. Grimley
Assistant Examiner—D. A. Tone
Attorney, Agent, or Firm—Schwartz, Jeffery, Schwaab, Mack, Blumenthal & Koch

[57] ABSTRACT

An aerial terminal has a housing divided into back and front compartments by a dividing wall which has a zig-zag formation from top to bottom. A top section of the dividing wall is set forward from a bottom section and a row of apertures is formed in each section. In a preformed arrangement the apertures are oblong and inclined towards each other in pairs. Terminals having shanks fitting in the apertures have transverse holes orientated by the apertures, to be also inclined towards each other in pairs. Shrouds surround the terminals and a channel in each shroud acts to guide a drop-wire conductor into the related terminal hole. The conductor is fastened by a screw in the front of the terminal. Conductors of a stub cable are attached to the rear portions of terminals extending into the back compartment, and the back compartment is filled with potting compound, which holds on a back cover. A front cover clips on to close the front compartment. A plurality of housings can be fastened together to provide an increased number of terminals.

25 Claims, 12 Drawing Figures

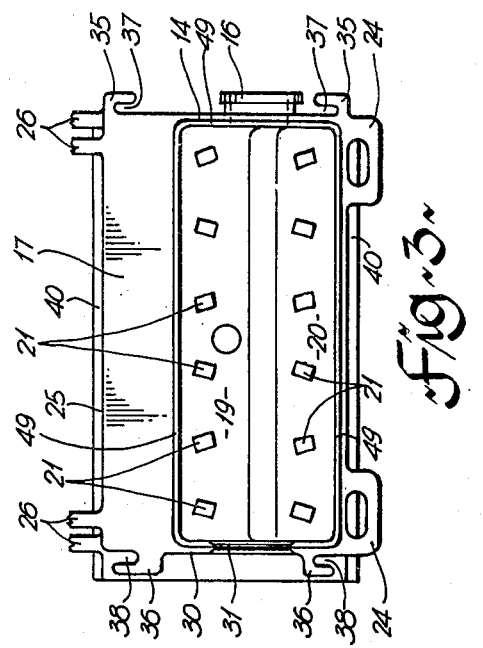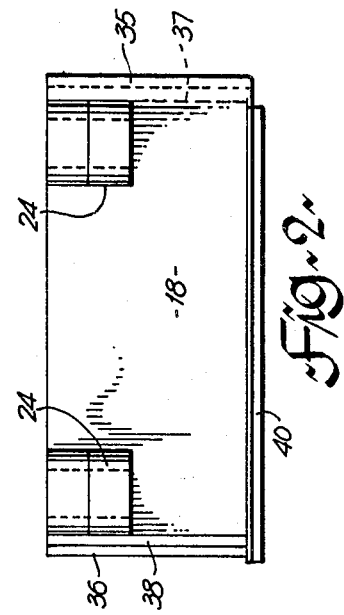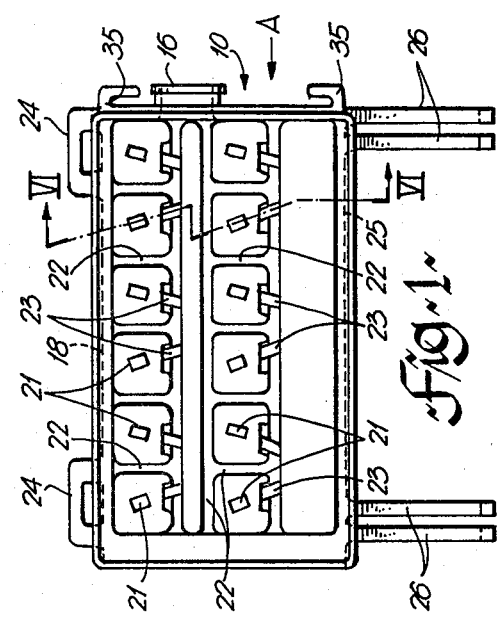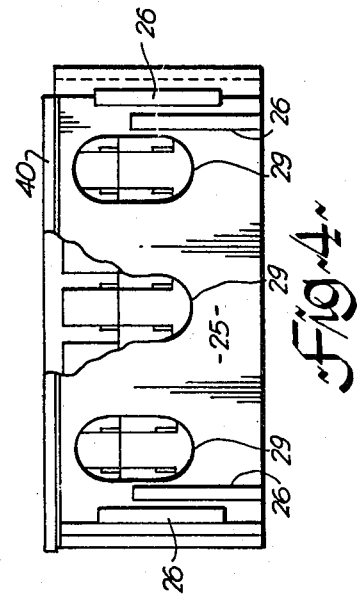

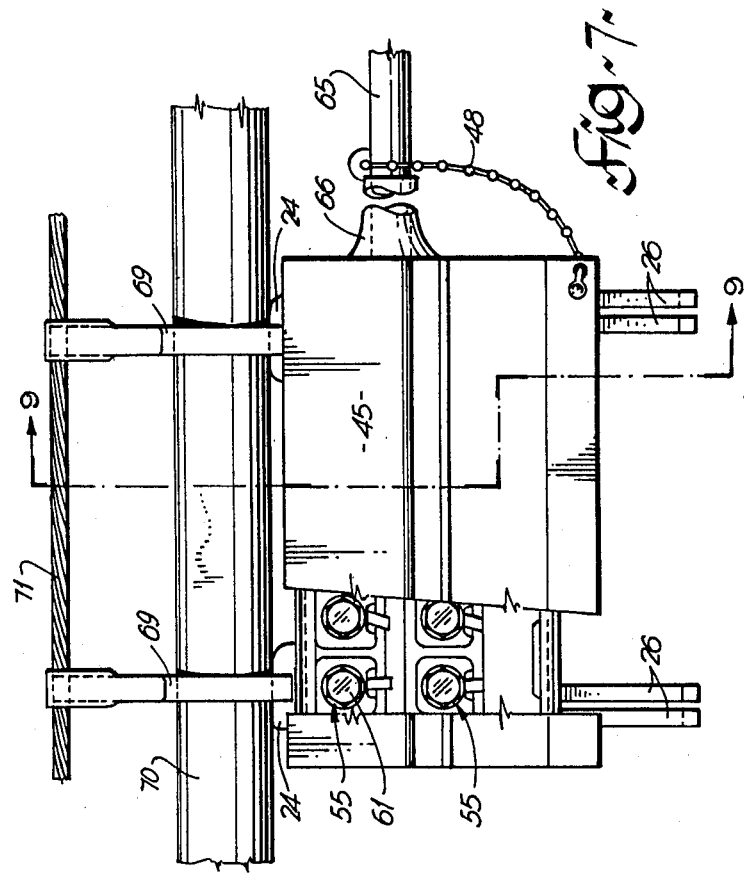
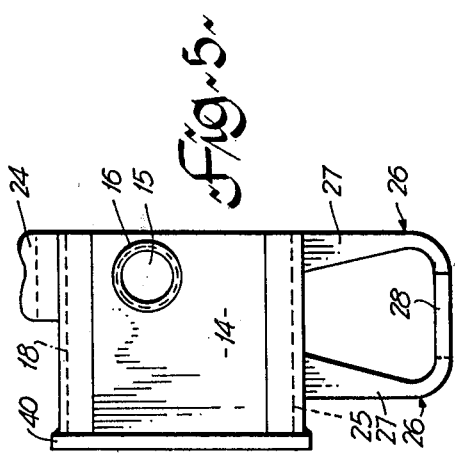
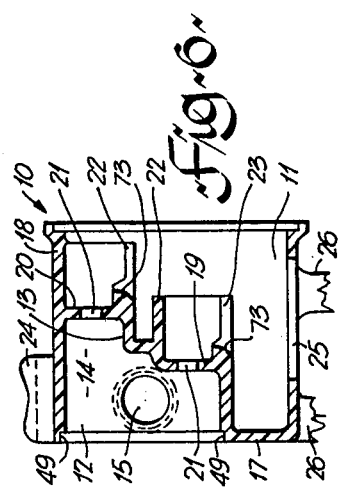

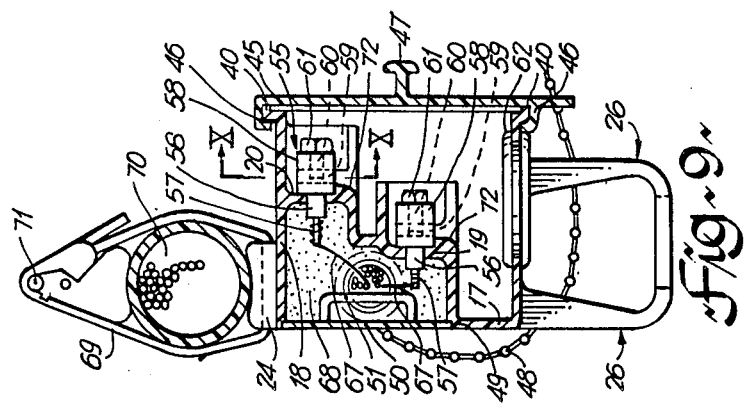
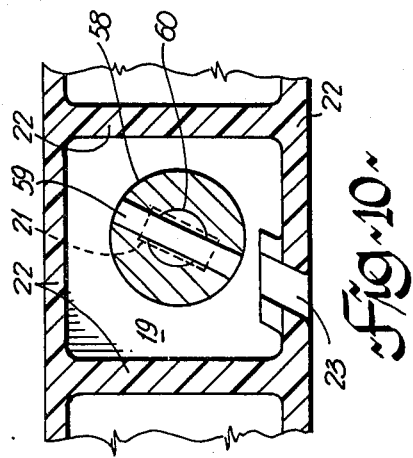
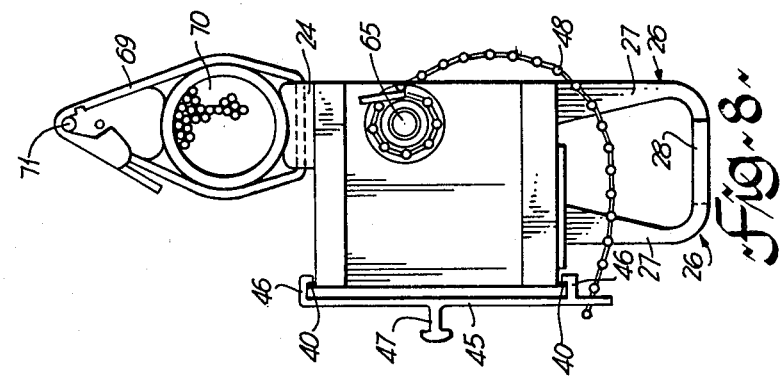

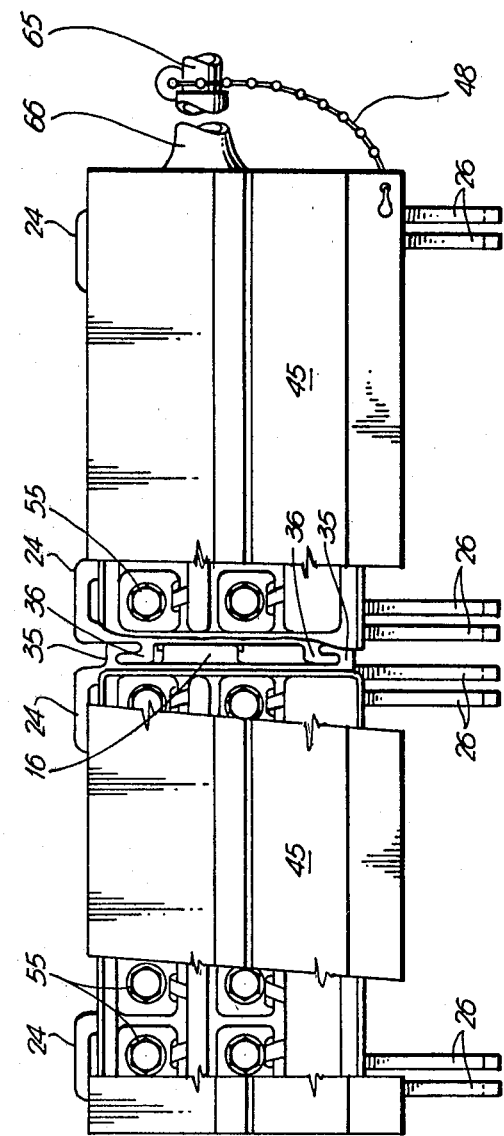

AERIAL CABLE TERMINAL

BACKGROUND OF THE INVENTION

This invention relates to aerial cable terminals, and is particularly concerned with such terminals, for telecommunications, where connection to only a few conductors of a cable is required.

Generally, with aerial terminals, there is a housing which surrounds the cable, the cable sheath being removed for the length of the housing, to expose all of the conductors. The conductors are connected to terminals on one side of a dividing wall, the terminals extending through the wall. Drop wires, connecting to subscribers and the like, are connected to the terminals on the other side of the wall.

In such an arrangement, the entire sheath is removed and all conductors are exposed. The terminal usually provides sealing and protection for the unsheathed section of cable. Where only a few drop wires are to be connected to the cable, this arrangement is not completely satisfactory. The present invention provides a terminal for use where only a limited number of conductors is to be connected to the cable.

SUMMARY OF THE INVENTION

An aerial terminal, in accordance with the invention comprises a modular block or housing for suspension from the main cable, the housing having two compartments, back and front, one end of a stub cable having the desired number of pairs of conductors entering the back compartment. The other end of the stub cable is connected to the main cable, the connection being sealed. Terminals for conductors extend through the wall dividing the housing into two compartments, the conductors of the stub cable being connected to the back ends of the terminals. The back compartment has a back plate or cover which is removed for connection of the stub cable conductors. After connection the back plate is replaced and the back compartment filled with potting compound. The back plate is permanently retained in place by the compound. The terminals are inclined or canted in the wall and access ports in the front compartment are oriented to assist in guidance of drop-wire conductors into the terminals. Housings can be connected together to provide for multiples of terminals. The front compartment is closed by a cover.

BRIEF DESCRIPTION OF THE DRAWINGS

The above details, and various other features, will be readily appreciated from the following description, in conjunction with the accompanying drawings, in which:

FIG. 1 is a front view of a modular block, with a front cover removed;

FIGS. 2, 3 and 4 are top, rear and bottom views respectively, FIG. 3 showing the device in an inverted orientation;

FIG. 5 is an end view in the direction of arrow A in FIG. 1;

FIG. 6 is a cross-section on the line VI—VI of FIG. 1;

FIG. 7 is a front view with the cover in place, the terminal suspended from a cable;

FIG. 8 is an end view of the suspended terminal in FIG. 7;

FIG. 9 is a cross-section similar to that of FIG. 6, but with terminals in the dividing wall, the conductors of the stub cable connected and the back compartment filled with compound;

FIG. 10 is a cross-section on the line X—X of FIG. 9;

FIG. 11 is a front view of two modular blocks interconnected;

DETAILED DESCRIPTION OF PREFERRED EMBODIMENTS

Figure 12:
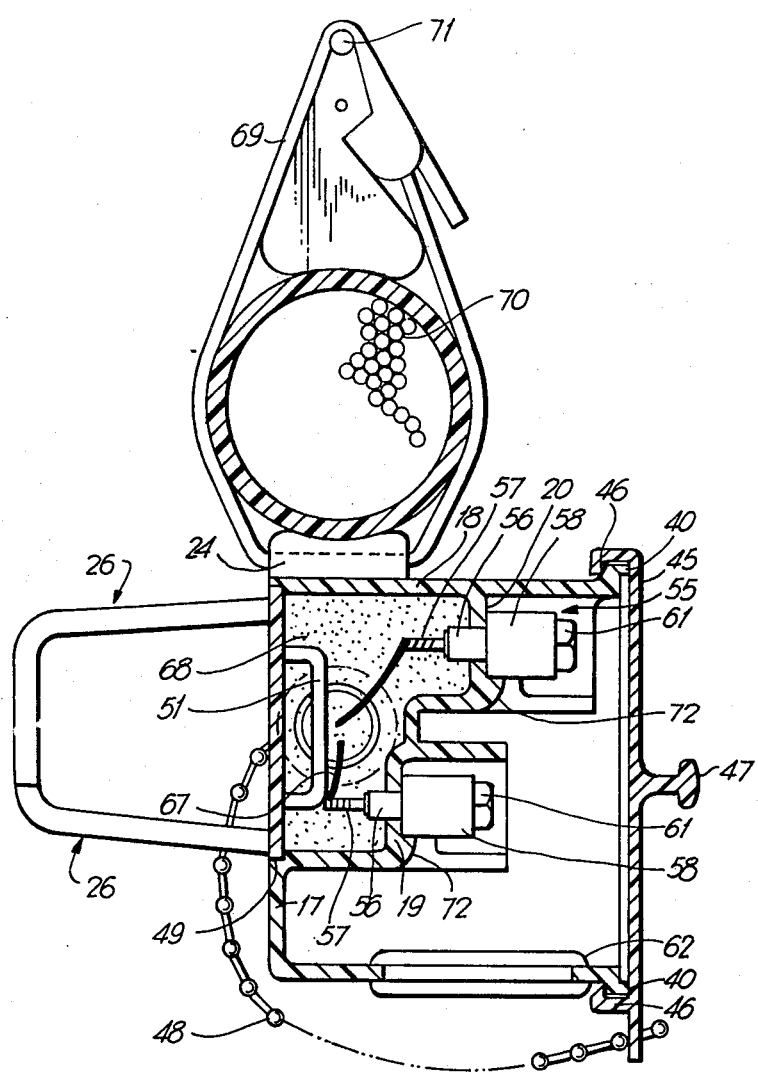
FIG. 12 is a cross-section similar to that of FIG. 9, illustrating a modified form of aerial terminal.

A cable terminal as illustrated in FIGS. 1 to 7, comprises a block or housing 10 divided into front and back compartments 11 and 12 by a dividing wall 13, (FIG. 6). In one end wall, 14, there is a circular aperture 15 which communicates with the back compartment. A tubular extension 16 projects from the outer side of the end wall around the aperture 15.

The dividing wall extending in a zig-zag formation, at its lower end being attached to the top part of a lower back wall 17 and at its upper end connected to a top wall 18 at a position between the front and back edges; in the example slightly nearer the front than the back. Two intermediate sections 19 and 20, upper and lower, are formed in the wall, and rectangular apertures, in the example oblong apertures, 21, formed in the sections. The apertures 21 are inclined, in pairs, each aperture of a pair having its axis inclined downward and inward. Projecting forward from each section are shrouds 22 which surround each aperture 21, channel shaped apertures 23 being formed in the bottom wall of each shroud to provided access to terminals mounted in the apertures 21.

U-shaped brackets 24 are provided on the top wall 18 for suspension of the cable terminal. In the example illustrated, drop wire support rings extend down from the bottom wall 25, a ring at each end, each ring formed by a pair of hook-shaped members 26, the stems 27 of the hooks offset and the hooked parts 28 overlapping. The hook-shaped members are spaced apart slightly to allow insertion of drop wires without the ends being free. A plurality of apertures 29, in the present example three, are formed in the bottom surface 25, for passage of drop-wires.

The end wall 30, at the other end of the block to wall 14, has an aperture 31 therein. This aperture is for use when two blocks are connected together, as explained later. As seen more clearly in FIG. 3, and partly seen in FIG. 1, each end wall 14 and 30 has two hook-shaped members 35 and 36.

The members extend across the widths of the end walls and on end wall 14 the members 35 extend approximately from the level of the top and bottom walls 28 and 25, the hook portions facing towards each other. On end wall 30 the hook portions face away from each other and are spaced away slightly from the top and bottom wall levels. The hook-shaped members define channels 37 and 38, channels 37 inward facing and channels 38 outward facing. Two blocks 10 can be interconnected by sliding the hooked portions of members 35 into the channels 38 of the next block, the hooked portions of this next block sliding in channels 37 of the first block.

Considering FIG. 1, the front of the block extends, to the left, slightly beyond the extent of the members 36, while members 35 extend clear. Two blocks are assembled by presenting the right hand end of one block, as seen in FIG. 1, to the back of the left hand end of a second block, and then moving the first block forward (or second block rearward). When the member 36 abuts the front of the mating block, the two blocks are in correct relative position.

The aperture 31 in end wall 30 opens toward the back wall and therefore, as two blocks are assembled together, the extension 16 on one block is aligned with aperture 31 in the other block.

A front cover or lid snaps on over the front of the block 10. Particularly as seen in FIGS. 2, 3, 4, 6 and 7, there is a rib 40 along the top and bottom edges at the front. The lid is a generally flat member with its side edges turned over to form channels which fit over the ribs. This can readily be seen in FIGS. 8 and 10. The lid or cover is indicated at 45, the turned over edges at 46. A handle 47 is provided, generally at the center of the cover, for removing and replacing the cover. Conveniently the front cover is prevented from falling away, when removed, by a chain or other flexible tie 48.

There is also a back cover which closes off the back compartment 14. The back cover fits in the opening defined by the back wall 17, the back of the top wall 18 and the end walls. There is a shallow recess or groove 49 for reception of the periphery of the back cover, seen in FIGS. 6 and 9 particularly. The back cover is seen at 50. The back cover has two loop members 51, FIG. 9, on its inner surface and when compound is injected into the back compartment, the back cover is held permanently in position by the compound surrounding the loop members 51.

Conductor terminals 55 are illustrated inserted in the apertures 21 in wall 13 in FIGS. 7 and 9, with an enlarged cross-section in FIG. 10. Each terminal has a rectangular shank portion 56 which is a force fit in an aperture 21, and having an extension 57 for attachment or connection of a conductor from the stub cable. The main body portion 58, in the example, is cylindrical, and has a hole or aperture 59 therethrough for reception of a stripped conductor, the hole 59 having a predetermined orientation relative to the shank portion 56. A threaded bore 60 permits a threaded screw 61 to be tightened down and clamp the conductor. The terminal is usually of brass, although other metals can be used. Also, as seen in FIG. 9, elastomeric grommets 62 are positioned in the apertures 29 in the bottom wall 25. The fitting of the shank portion 56 in the aperture 21, provides a predetermined orientation of the holes 59 of the terminals. The holes 59, of a particular pair of terminals will have their axes inclined downward and inward.

The cable terminal is normally prepared at a factory or assembly plant, prior to installation in the field. The back cover of the cable terminal is removed and a small cable 65, for example a six pair cable, fed through the tubular extension 16, sealing being provided by a heat shrink tubing 66. The individual conductors 67 of the small or stub cable 65 are separated, the ends stripped, and attached to the extensions 57, as by wire wrapping or soldering. The conductors 67 are attached, or connected, in pairs. Thus for telephone wires, a tip conductor and a ring conductor are connected to adjacent terminals. Once all the conductors 67 have been connected to terminals, the back cover 50 is put in position and held in place while compound is injected into the back compartment. This compound is indicated at 68 in FIG. 9.

The cable terminal is installed by suspending from the main cable, and support wire, by ties 69, which pass through the brackets 24. The main cable is at 70 and the support wire at 71. To install a drop wire, the two conductors of the wire are separated for a short distance and the conductor ends stripped of insulation. Considering the lower row of terminals, the two stripped conductors are pushed up through a grommet in an aperture 29 and then the conductor ends fed up through two adjacent apertures 23. As stated, the terminals 55 are oriented by the inclined apertures 21, and as seen in FIG. 10, the apertures 23 and holes 59 in the terminals are aligned. Further, the bottom surfaces of the apertures 23 are inclined and slightly rounded to act as ramps, as at 72 in FIGS. 6 and 9. This arrangement guides the conductors into the holes 59. The screw 61 is then tightened down. The drop wires, are then installed in the rings formed by members 26. While the drop wires are being connected, the front cover is allowed to hang, held by the tie 48. The cover is snapped on by, for example hooking over the top rib 40 and then pushing on the center so that the cover distorts and the bottom edge snaps over the bottom rib 40. The cover is removed by lifting the bottom edge to bend the cover and enable the member 46 to disengage from the rib 40. The cover can then be entirely removed.

The block, and covers, are made of non-metallic material, and thus are corrosion resistant. Conveniently the front cover is extruded and different lengths cut depending on the number of blocks used. Thus in FIG. 7, a single block length of front cover is used. In FIG. 11, two blocks ganged together are illustrated, with a double length of cover extending over both blocks.

While in a particular example, six pairs of terminals are provided, the blocks can be ganged to provide larger pair counts. With the tubular extension 16 of one block extending into the adjacent block, there is protection for conductors of the stub cable to pass from one block to the other.

The terminals, being oriented, with the guidance of the apertures 23, allow the drop wire conductors to be slit and stripped to predetermined lengths, inserted through an aperture 29 and self-fed into the terminals with only an axial force. Once in place the screws 61 are tightened. No preparation of the conductor end, as by "hooking", is required as occurs with studs with washers and nuts. Orientation of the terminals is accomplished by way of the inclined rectangular apertures 21 and the matching rectangular portions 56 on the terminals 55. This orientation gives self-feeding of the conductors with minimum end preparation. The rectangular apertures and portions also resist the tightening torque of the screws 61.

The shrouds 22 around each terminal 55 provide improved insulation resistance path and a condensation shield between the upper and lower terminals. The drop wire rings permit the drop wires to be inserted or removed without removing the conductors from the terminals 55. The integral moulding of the tubular extension 16 with the block 10 improves the assembled strength of cable and block and eliminates leakage of potting compound.

FIG. 12 illustrates an alternative arrangement in which the drop wire support rings are formed on the back cover 50, instead of depending from the bottom wall 25 of the housing. The form of the rings is the same, that is each ring formed by a pair of hook-shaped members 26.

Various indicia can be placed on the terminal housing, such as initials T and R molded in adjacent to appropriate terminals 55, color code indications and similar information and/or instructions. Similarly information and/or instructions, including color coding and the like can be provided on the cover 45. If necessary, small vents may be provided in the housing walls to ensure complete filling of the terminal with compound.

Also, while less convenient, it would be possible to make the apertures 21 with their axes parallel and form the terminals 55 so that the holes 59 have a desired orientation. Two forms of terminal 55 would then probably be required and selective assembly of terminals to housing used to ensure inwardly inclined pairs of holes. Both the apertures 21 and the shank portions could be square or some other polygonal form.

What is claimed is:

1. An aerial cable terminal, comprising:
   a housing, the housing including top and bottom walls, end walls, and a dividing wall extending from said top wall to divide the interior of the housing into a back compartment and a front compartment;
   apertures in said dividing wall and a conductor terminal positioned in each aperture, each conductor terminal having a rear portion extending into said back compartment and a front portion extending into said front compartment;
   said rear portion of each conductor terminal adapted for connection of a stub cable conductor thereto;
   said front portion of each conductor terminal having a hole therethrough, transverse to the longitudinal axis of the conductor terminal, for reception of a drop-wire conductor;
   said conductor terminals arranged in pairs, the holes in said front portions of a pair inclined downwardly and inwardly towards each other;
   shrouds extending forward from said dividing wall and surrounding each conductor terminal, and a channel in each shroud, the channel aligned with said hole in the related conductor terminal;
   access means in one end wall for entry of a stub cable;
   a back cover in the back of said housing for access to said back compartment and a removable front cover closing the front of said front compartment.

2. A cable terminal as claimed in claim 1, said apertures being rectangular, said conductor terminals each including a shank portion having a cross-section conforming to and a tight fit in an aperture.

3. A cable terminal as claimed in claim 2, said apertures being oblong.

4. A cable terminal as claimed in claim 3, the apertures forming a pair having their longitudinal axes inclined downwardly and inwardly, to provide said downward and inward inclination of said holes.

5. A cable terminal as claimed in claim 1, said apertures arranged in rows extending end-to-end of said dividing wall.

6. A cable terminal as claimed in claim 5, said conductor terminals of a pair positioned side-by-side in a row.

7. A cable terminal as claimed in claim 1, said dividing wall extending in a zig-zag formation, including an upper section extending downward from the top wall at a position between front and back edges of the top wall; and a lower section below and rearward of said upper section, said lower section connected to said upper section.

8. A cable terminal as claimed in claim 7, said housing including a back wall extending up from said bottom wall at a rear edge, said back wall extending upward part way towards said top wall, said lower section of said dividing wall connected at its lower edge to a top edge of said back wall.

9. A cable terminal as claimed in claim 8, including a row of said apertures in each of said upper and lower sections of said dividing wall.

10. A cable terminal as claimed in claim 1, said access means in said one end wall comprising a tubular projection extending from an outer surface of said end wall, the bore of said extension extending through the end wall.

11. A cable terminal as claimed in claim 10, including an aperture in the other end wall of said housing, in axial alignment with said tubular projection.

12. A cable terminal as claimed in claim 1, each of said channels in said shrouds including a bottom surface, said bottom surface acting as a guide ramp for a drop-wire conductor.

13. A cable terminal as claimed in claim 1, including formations on the outer surface of each end wall, said formations providing interengaging formations when two cable terminals are joined end-to-end.

14. A cable terminal as claimed in claim 13, said formations on said end walls comprising:
   two inwardly facing hook-shaped members at one end of said housing, a member at top and bottom of the said one end wall, each hook-shaped member defining, with said one end wall, an inward opening channel;
   two outwardly facing hook-shaped members at the other end of said housing, the members spaced in from the top and bottom of the said other end wall, each hook-shaped member defining, with said other end wall, an outward opening channel, said hook-shaped members positioned and formed such that said channels at one end of a housing accept the hook-shaped members on the end wall of a further housing, the hook-shaped members entering said channels by relative front-to-back movement of said housings.

15. A cable terminal as claimed in claim 1, including means on said top wall for suspending the cable terminal from a cable.

16. A cable terminal as claimed in claim 1, said back cover including formations extending into said back compartment, for envelopment by a potting compound injected into said back compartment and retention of said back cover in position.

17. A cable terminal as claimed in claim 1, including a drop-wire support ring adjacent to each end of said housing.

18. A cable terminal as claimed in claim 17, said drop-wire support rings extending from said back cover.

19. A cable terminal as claimed in claim 17, said drop-wire support rings extending from said bottom wall.

20. A cable terminal as claimed in claim 17, each drop-wire support ring comprising a pair of hook-shaped members, the stems of the hook-shaped members spaced apart in a direction normal to the length of the cable terminal and the hooked parts in overlapping slightly spaced arrangement.

21. A cable terminal as claimed in claim 1, including apertures in said bottom wall for access of drop-wire conductors to said front portions of said conductor terminals.

22. A cable terminal as claimed in claim 1, said front including channels at top and bottom edges for engagement over front edges of said top and bottom walls.

23. A cable terminal as claimed in claim 22, including retaining means for retaining said front cover attached to the housing, when said cover is removed.

24. A cable terminal as claimed in claim 1, including a stub cable inserted through said access means in said one end, means sealing the cable entry at said access means, said stub cable including a plurality of conductors; a conductor connected to each of said rear portions of said conductor terminals, and potting compound filling said back compartment, said back cover retained in position by said compound.

25. A cable terminal as claimed in claim 24, said access means comprising a tubular extension on an outer surface of said one wall, said extension including a bore extending through the end wall, said means sealing the cable entry comprising a heat shrink tube extending over said tubular extension to said cable.

* * * * *